(12) United States Patent
Knoppers et al.

(10) Patent No.: US 10,451,449 B2
(45) Date of Patent: Oct. 22, 2019

(54) OPTICAL SENSOR DEVICE, SENSOR APPARATUS, CABLE AND METHOD OF MANUFACTURING

(71) Applicant: Fugro Technology B.V., Leidschendam (NL)

(72) Inventors: German Enrique Knoppers, The Hague (NL); Thomas Theodorus Nicolaas Johannes Wagemakers, The Hague (NL); Devrez Mehmet Karabacak, Leidschendam (NL); Rudolf Klaas Van Beelen, The Hague (NL); Bastiaan Meulblok, The Hague (NL)

(73) Assignee: Fugro Technology B.V. (NL)

( * ) Notice: Subject to any disclaimer, the term of this patent is extended or adjusted under 35 U.S.C. 154(b) by 182 days.

(21) Appl. No.: 15/572,646

(22) PCT Filed: May 8, 2015

(86) PCT No.: PCT/NL2015/050320
§ 371 (c)(1),
(2) Date: Nov. 8, 2017

(87) PCT Pub. No.: WO2016/182431
PCT Pub. Date: Nov. 17, 2016

(65) Prior Publication Data
US 2018/0156643 A1  Jun. 7, 2018

(51) Int. Cl.
*G01D 5/34* (2006.01)
*G01D 5/353* (2006.01)
(Continued)

(52) U.S. Cl.
CPC ..... *G01D 5/35377* (2013.01); *G01D 5/35316* (2013.01); *G01H 9/004* (2013.01);
(Continued)

(58) Field of Classification Search
CPC ........... G01D 5/35316; G01D 5/35377; G01H 9/004; G01P 15/093
(Continued)

(56) References Cited

U.S. PATENT DOCUMENTS 6,175,108 B1    1/2001  Jones et al.
6,807,325 B1   10/2004  Kraemmer et al.
(Continued)

FOREIGN PATENT DOCUMENTS

DE    102013101432 A1   8/2014
WO      2012153335 A1  11/2012

OTHER PUBLICATIONS

International Search Report and Written Opinion; PCT Application No. PCT/NL2015/050320; dated Feb. 4, 2016.
(Continued)

*Primary Examiner* — Kevin K Pyo
(74) *Attorney, Agent, or Firm* — Polsinelli PC

(57) ABSTRACT

The invention is directed at an optical sensor device, comprising a sensing element for receiving an input action, an optical fiber comprising an intrinsic fiber optic sensor, and a transmission structure arranged for exerting a sensing action on the optical fiber in response to the input action received by the sensing element, wherein the optical fiber in a first connecting part thereof is connected to a reference body and wherein the optical fiber in a second connecting part thereof is to the transmission structure for receiving the sensing action, the first connecting part and the second connecting part of the optical fiber being located on either side of the intrinsic fiber optic sensor, wherein the transmission structure comprises a bi-stable spring having a first and a second stable deflection position and a negative stiffness range around an unstable equilibrium position between the first and second stable deflection position, and wherein the
(Continued)

optical fiber between the transmission structure and the reference body is pre-stressed such as to be tensed, said optical fiber thereby acting as a spring having a first spring constant of positive value, wherein the optical fiber thereby counteracts a spring action of the bi-stable spring such as to operate the bi-stable spring in a deflection position range within the negative stiffness range, the deflection position range not including the unstable equilibrium position of the bi-stable spring.

15 Claims, 8 Drawing Sheets

(51) Int. Cl.
   *G01H 9/00* (2006.01)
   *G01P 15/093* (2006.01)
   *G01L 1/24* (2006.01)
   *G01L 5/00* (2006.01)
   *G01P 15/08* (2006.01)

(52) U.S. Cl.
   CPC ............ *G01L 1/246* (2013.01); *G01L 5/0057* (2013.01); *G01P 15/093* (2013.01); *G01P 2015/0837* (2013.01); *G01P 2015/0857* (2013.01)

(58) Field of Classification Search
   USPC ........................................ 250/227.11, 227.14
   See application file for complete search history.

(56) References Cited

U.S. PATENT DOCUMENTS

| | | | |
|---|---|---|---|
| 10,254,304 B2* | 4/2019 | Duraffourg | G01P 15/0802 |
| 2009/0185773 A1 | 7/2009 | Lee | |
| 2009/0293583 A1 | 12/2009 | Stewart et al. | |

OTHER PUBLICATIONS

English abstract of DE102013101432; retrieved from www.espacenelcom on Nov. 7, 2017.
Wilfried, Noell et al: "Applications of SOI-Based Optical MEMS,"; IEEE Journal of Selected Topics in Quantum Electronics, IEEE Service Center, Piscataway, NJ, US; vol. 8, No. 1, Jan. 1, 2002; XPO11062026, ISSN: 1077-260X p. 150; figure 2b.

* cited by examiner

OPTICAL SENSOR DEVICE, SENSOR APPARATUS, CABLE AND METHOD OF MANUFACTURING

CROSS-REFERENCE TO RELATED APPLICATIONS

This application is a national stage application of International Application No. PCT/NL2015/050320, which was filed on May 8, 2015, of which is incorporated by reference in its entirety.

FIELD OF THE INVENTION

The present invention relates to an optical sensor device, in particular an optical sensor device applying an intrinsic fiber optic sensor. The invention further relates to a method of manufacturing.

BACKGROUND

A known class of optical sensors for various applications includes the use of intrinsic fiber optic sensors. An intrinsic fiber optic sensor is a sensor that uses an optical fiber as sensing element. In many applications the intrinsic fiber optic sensor is lit (e.g. by a laser), and a change in the fiber due to an external cause (dependent on the type of sensor) results in a measurable change in the optical signal transmitted by or received from the sensor. A typical example of an intrinsic fiber optic sensor is a Fiber Bragg Grating (FBG).

An FBG comprises a fiber having a core including therein, over a certain distance, a periodic variation of the refractive index. This periodic variation forms a wavelength-specific dielectric mirror, wherein light in a specific (narrow) range around and including a certain wavelength is reflected. The wavelength reflected is determined by the periodicity of the refractive index of the core. The FBG is based on the principle that a difference in strain of the optical fiber causes the geometric periodicity of the variations to change. This results in a change of the reflected wavelength, such change can be detected (e.g. by spectral analysis, or using an interferometer).

Fiber Bragg Gratings are applied in many applications for measuring a wide range of parameters and characteristics, including static and dynamic parameters. For example, an FBG may be applied in a pressure sensor by converting an exerted exterior pressure into a variable force applied to the fiber including the FBG. Another application, usable for example to perform geological survey, is the application of an FBG in an accelerometer e.g. for measuring soil vibrations. Such sensors are advantageously applied for example in the oil and gas industry, e.g. to analyze the structure of the soil and to identify cavities or porous rock formations.

For many of these applications, it is required that the size of the optical sensor device is small, for example to enable implementation in a cable that may be useable for exploration and geological survey at land, at sea or in a borehole, or to measure vibrations in a building, a bridge or other construction. However, achieving the desired size reduction often comes at the cost of sensitivity of the sensor, and this trade-off is usually not desired. Moreover, sensitivity and size are not the only characteristics that are of interest. In particular for dynamic sensors, a broad dynamic operational frequency range is desired. An upper limit of this operational frequency range is determined by the resonance frequency of the sensor device. Even for static sensors, fast and accurate response to variations is often required. Matching all these requirements in an optical fiber design is complex because they are related to each other, and meeting one requirement often deteriorates the design for another requirement. Hence, additional measures are required to further enhance the sensitivity of such an optical sensor element, in view of the constraints given.

SUMMARY OF THE INVENTION

It is an object of the present invention to provide a highly sensitive optical sensor device having a broad operational frequency range.

To this end, there is provided herewith an optical sensor device, comprising a sensing element for receiving an input action, an optical fiber comprising an intrinsic fiber optic sensor, and a transmission structure arranged for exerting a sensing action on the optical fiber in response to the input action received by the sensing element, wherein the optical fiber in a first connecting part thereof is connected to a reference body and wherein the optical fiber in a second connecting part thereof is to the transmission structure for receiving the sensing action, the first connecting part and the second connecting part of the optical fiber being located on either side of the intrinsic fiber optic sensor, wherein the transmission structure comprises a bi-stable spring having a first and a second stable deflection position and a negative stiffness range around an unstable equilibrium position between the first and second stable deflection position, and wherein the optical fiber between the transmission structure and the reference body is pre-stressed such as to be tensed, said optical fiber thereby acting as a spring having a first spring constant of positive value, wherein the optical fiber thereby counteracts a spring action of the bi-stable spring such as to operate the bi-stable spring in a deflection position range within the negative stiffness range, the deflection position range not including the unstable equilibrium position of the bi-stable spring.

The invention is based on the insight that in certain optical sensor devices comprising intrinsic fiber optic sensors, e.g. strain-based sensors, the stiffness of the detection element (i.e. the optical fiber comprising the intrinsic fiber optic sensor) can be a limiting factor for sensitivity. This is in particular the case for small sized and highly sensitive sensors. For example, there is a limitation in minimum achievable diameter for glass fibers including an FBG. Beyond the minimum diameter achievable (i.e. at even smaller diameters), manufacturing, performance and handling issues become prohibitive. At present, for a glass fiber including an FBG, the minimum achievable diameter is approximately 60 micron.

This minimum diameter in combination with the material of choice determines the minimum achievable stiffness of the optical fiber including the intrinsic fiber optic sensor. Because of the interrelation with other characteristics of a sensor design, this minimum stiffness sets a limit to the obtainable sensitivity. This may be understood as follows. In a strain based system, the strain of the optical fiber including the intrinsic fiber optic sensor is used to obtain the required information for sensing. For example, in an accelerometer based on an FBG, the input action on the sensor will be a vibration which is converted into a periodic strain variation of the fiber. This causes the reflected wavelength of the FBG to vary correspondingly, as it is linearly dependent on the strain in the fiber, and the variation in reflected wavelength can be determined very accurately (e.g. with an interferometer or a spectral analyzer). However, it may be understood that the sensitivity of such a system increases in case the amount of stretching and shortening responsive to a given input action can be increased—the more the fiber is stretched in response to a given input action, the better input actions of smaller magnitude can be sensed.

The present invention allows to reduce the stiffness of the system forming the optical sensing device. This may be achieved while maintaining the tension in the optical fiber comprising the intrinsic fiber optic sensor. Moreover, the amplifying effect of the negative stiffness mechanism provided by the bi-stable spring effectively decreases the spring constant of the optical fiber. Hence, the intrinsic fiber optic sensor provides a stronger response to an input action, causing the optical sensor device of the present invention to be more sensitive. All this may be obtained without any modification to the optical fiber. Hence, using an optical fiber including an intrinsic fiber optic sensor of minimal diameter (e.g. 60 micron), the sensitivity of the system can be further increased by including the bi-stable spring and operating it in the deflection position range wherein the bi-stable spring acts as a negative spring.

As may be appreciated, the tension in the optical fiber causes the optical fiber to act as a spring having a positive spring constant. The amount of stretching of the fiber is linearly dependent on the force applied, divided by the spring constant (Hooke's law). In the present invention, however, the optical fiber cooperates with the bi-stable spring in the transmission structure. The bi-stable spring is operated in a deflection position range wherein it exhibits negative spring behavior. The negative spring behavior can be modelled (in a first order estimate) by a linear spring having a negative spring constant: the larger the deflection, the less force is required for further deflection. The optical fiber is connected to the transmission structure such that the positive spring behavior of the optical fiber counteracts the negative spring behavior of the bi-stable element. In fact, the optical fiber counteracts a spring action of the bi-stable spring such as to operate the bi-stable spring in a deflection position range within the negative stiffness range, the deflection position range not including the unstable equilibrium position of the bi-stable spring. This provides the advantage that the fiber is kept tensed due to the interaction with the bi-stable spring, while at the same time preventing the bi-stable spring to reach the unstable equilibrium position. If the bi-stable spring were to reach the unstable equilibrium position, the spring would snap towards the other stable deflection position causing the fiber to either break or release.

The optical fiber acts as if its stiffness is reduced as a result of the negative spring behavior of the bi-stable spring. As a result, this causes the optical sensor device to respond stronger to an input action, hence having an increased sensitivity. The cooperation between the optical fiber and the bi-stable spring exhibiting negative spring behavior, in accordance with some embodiments, results in a combined net total spring constant of the system that is lower than the positive spring constant of the optical fiber itself. In these embodiments, the positive spring constant of the fiber is at least slightly larger than the absolute value of the negative spring constant of the bi-stable spring at every deflection position of the deflection position range wherein the bi-stable spring is operated.

In reality, however, it is not straightforward to create multiple bi-stable springs in series while ensuring that their spring characteristics are all the same (or at least within given tolerance levels). In applications wherein a high level of accuracy is desired, or wherein a plurality of similar sensors is to be applied that are all more or less similarly sensitive and accurate, variations in spring behavior of the bi-stable springs may not be desired. Therefore, in accordance with some embodiments, the sensor device further comprises an adjustment arrangement for tuning of the combined net total spring constant of the optical sensor device. The adjustment arrangement may for example be directed at adjusting of the structure or characteristics of the bi-stable spring itself, or to its contribution in the combined net total spring constant (i.e. its contribution in the transfer function of the optical sensor device).

In some particular embodiments, the transmission structure comprises a transmission arm, wherein the bi-stable negative spring is connected with the transmission arm at a first location thereof, and wherein the optical fiber is connected with the transmission arm at a second location thereof, the transmission arm being pivotable relative to a pivot, wherein the adjustment arrangement comprises an adjustment element for adjusting the location of the pivot for enabling adjustment of a transmission ratio thereof. In this embodiment, by adjusting the location of the pivot along the transmission arm, the transmission ratio of the arm becomes adjustable. By connecting the optical fiber and the bi-stable spring at different locations along the transmission arm, adjustment of the transmission ratio results in adjustment of the dimensioning of the contributions by the optical fiber having the positive spring constant and the bi-stable spring exhibiting the negative spring behavior characterizable by the negative spring constant. Any differences in characteristics of individual bi-stable springs and/or optical fibers can be overcome by proper adjustment.

For example, a screwable adjustment arrangement that allows movement of the pivot slightly by turning of the screw would allow accurate adjustment. However, other accurate adjustment mechanisms may be applied. The application of a transmission arm has multiple advantages, as it also allows the contribution of other parameters and factors (outside those of the optical fiber and the bi-stable spring) to be sized or tuned dependent on the design of the optical sensor device.

In accordance with some other embodiments, the adjustment arrangement comprises a tunable positive spring element cooperating with the bi-stable spring for forming a spring assembly for enabling tuning of the negative second spring constant provided by the spring assembly, wherein the tunable positive spring element comprises a tuning arrangement for tuning the spring constant of the tunable positive spring element. Such a tunable positive spring element allows adjustment of the negative spring behavior of the bi-stable spring by compensating it with the positive spring constant. This positive spring constant may itself be made adjustable in a straightforward manner.

For example, in accordance with some specific embodiments thereof, the tunable positive spring element is an adjustable deflection beam, wherein the tuning arrangement comprises a position adjustment arrangement for adjusting a position of the deflection beam relative to the bi-stable spring. A deflection beam attached to a screw such as to allow the deflection beam to be adjusted along its length by moving it back or forth, enables adjustment of the point at which the bi-stable spring contacts the deflection beam. Hence, this allows the adjust positive spring constant of the deflection beam as applied to the bi-stable spring, which allows to adjust the resulting spring constant of the bi-stable spring applied to the system.

In accordance with some further embodiments, for limiting the deflection of the bi-stable spring, the optical sensor device further comprises at least one deflection limiting element cooperating with the bi-stable negative spring. The deflection of the bi-stable spring is preferably limited to the specific range wherein the delivered negative spring is constant. To prevent the bi-stable spring from adopting any deflection position outside the desired range, a deflection limiting element may be applied. In fact, the deflection beam of the abovementioned embodiment may already be applied as a limiting element as well. The deflection limiting element, in accordance with various embodiments, may comprise at least one of a group comprising: a limiting structure, a limiting beam, a limiting cord or a limiting string for setting a structural limit on an allowed deflection range of the bi-stable spring, or a further spring element.

In accordance with some further embodiments, the bi-stable spring comprises a deflection element and one or more leaf springs, the leaf springs connecting the deflection element with a fixed element, wherein the fixed element is fixed with respect to the reference body. The one or more leaf springs connect the deflection element to the fixed element in such a manner as to provide the deflection element with the first and a second stable deflection position. Such a bi-stable spring allows compact installation in an optical sensor device that may be made small in size. In some embodiments, the leaf springs of the bi-stable spring are buckled by pre-stressing these during manufacturing.

In some particular embodiments, the one or more leaf springs extend from fixed element under an angle therewith in a direction towards one of the first and second stable deflection positions, wherein said one stable deflection position is arranged with respect to the unstable equilibrium position at a same side as the deflection position range wherein the bi-stable spring is operated. Due to this angling of the leaf springs, the bi-stable spring across most of its full deflection range will have a preference to adopt said one stable deflection position (e.g. the first stable deflection position). This will thus shift the unstable equilibrium position towards the other stable deflection position (e.g. the second stable deflection position). As a result, the operational deflection position range within the negative stiffness range wherein the bi-stable spring is operated in accordance with the invention will be broader as compared to an embodiment wherein the leaf springs of the bi-stable spring would extend from the fixed element under a straight angle.

In accordance with some further embodiments, the transmission structure comprises a transmission arm, and wherein the bi-stable spring is formed by connecting an end part of the transmission arm with the fixed reference body by means of a pre-loaded spring. In embodiments applying a transmission arm, forming the bi-stable spring by preloading the end part of the transmission arm using a pre-loaded spring provides a convenient and compact implementation of the invention. For forming a bi-stable spring, the pre-loaded spring must be pre-loaded in the sense that the spring is compressed with respect to its equilibrium position, e.g. a compressed spiral type spring or a buckled leaf spring.

In accordance with some further embodiments, the optical fiber is connected with the second part thereof to the bi-stable spring. In these embodiments, a direct connection of the second connecting part or connecting end of the optical fiber to the deflection element or deflection point on the bi-stable spring directly couples the negative spring behavior exhibited by the bi-stable spring with the optical fiber for providing the combined net total spring constant.

In accordance with some further embodiments, the sensing element comprises at least one element of a group comprising an inertial mass such as to provide an accelerometer, a deformable body such as to provide a pressure sensor. Moreover, in general, embodiments of the invention may include at least one element of a group comprising: a dynamic sensor for sensing dynamic signals, or a static sensor for sensing static sensors. Furthermore, the intrinsic fiber optic sensor may comprise at least one of a Fiber Bragg Grating, photonic crystal fiber, a birefringent fiber, a fiber laser, or a multicore fiber.

In accordance with a second aspect of the invention, there is provided a sensor apparatus comprising one or more optical sensor devices according to the first aspect for sensing one or more input actions applied in one or more directions.

In accordance with a third aspect of the invention, there is provided a cable comprising at least one of a sensor apparatus according to the second aspect, or one or more optical sensor devices according to the first aspect.

In accordance with a second aspect of the invention, there is provided a method of manufacturing an optical sensor device, comprising providing a sensing element for receiving an input action, providing an optical fiber comprising an intrinsic fiber optic sensor, and providing a transmission structure for exerting, in operation, a sensing action on the optical fiber in response to said input action received by the sensing element, wherein the method further comprises: connecting the optical fiber between a reference body and the transmission structure such that the intrinsic fiber optic sensor if arranged between the transmission structure and the reference body; wherein the transmission structure is provided including a bi-stable spring having a first and a second stable deflection position and a negative stiffness range around an unstable equilibrium position between the first and second stable deflection position; and wherein the step of connecting the optical fiber to the transmission structure is performed by: pre-stressing the bi-stable spring to a deflection position arranged within the negative stiffness range at one side of the unstable equilibrium position; connecting the optical fiber to the transmission structure; and pre-stressing the optical fiber such as to be tensed, for thereby acting as a spring having a first spring constant of positive value, wherein the optical fiber thereby counteracts a spring action of the bi-stable spring such as to operate the bi-stable spring in a deflection position range within the negative stiffness range, the deflection position range not including the unstable equilibrium position of the bi-stable spring.

BRIEF DESCRIPTION OF THE DRAWINGS

The invention will further be elucidated by description of some specific embodiments thereof, making reference to the attached drawings. The detailed description provides examples of possible implementations of the invention, but is not to be regarded as describing the only embodiments falling under the scope. The scope of the invention is defined in the claims, and the description is to be regarded as illustrative without being restrictive on the invention. In the drawings:

DETAILED DESCRIPTION

Figure 1:
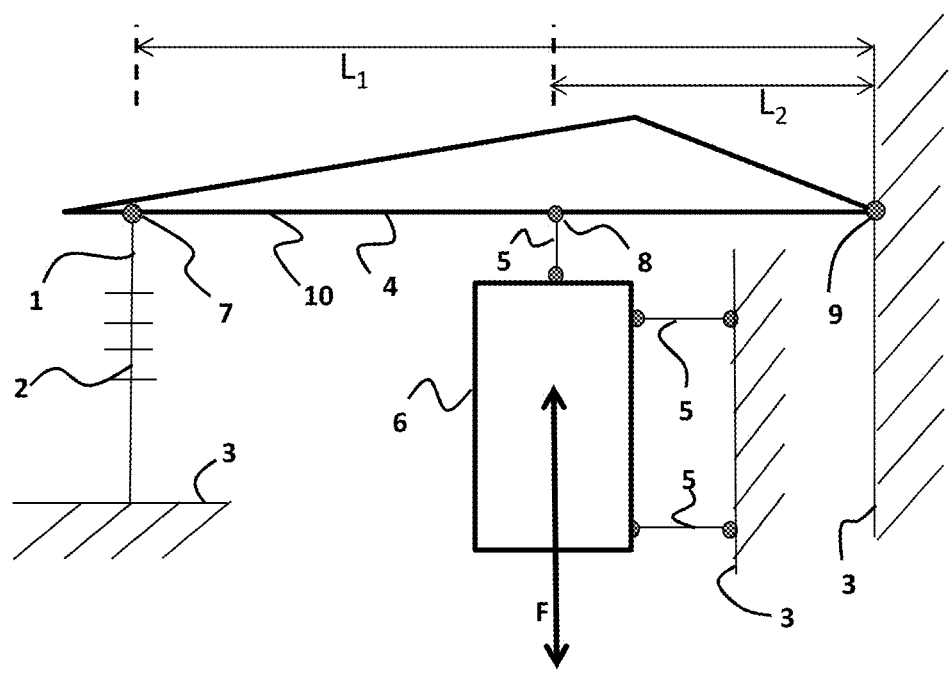
FIG. 1 illustrates an exemplary optical sensor device.

The advantages of the optical sensor device of present invention may become more clear by considering the sensitivity of an optical accelerometer. In the exemplary accelerometer of FIG. 1, a sensing element 6 is formed by an inertial mass. The sensing element 6 is arranged for receiving an input action F, e.g. a vibration as is schematically indicated by the double arrow. The sensing element 6 is connected to a fixed reference body 3 by means of hingeable connections 5, and further to a transmission arm 10 by a further hingeable connection 5 at location 8 along the arm 10. The transmission arm 10 is part of transmission structure 4, and is connected by a pivot 9 to the fixed reference body 3. Moreover, at location 7 along the transmission arm 10, an optical fiber 1 comprising a fiber bragg grating (FBG) 2 is connected thereto. The optical fiber 1 comprising the FBG 2 is further connected to the fixed reference body 3 on its other end with respect to the FBG 2. As may be appreciated, the reference body 3 may be a single structure, or may be comprised of a plurality of fixed parts that are at fixed positions with respect to each other.

For the exemplary accelerometer of FIG. 1, the transmission ratio T of the arm 10 for the sensing element 6 relative to the optical fiber 1 equals the ratio between the distances $L_1$ and $L_2$ from the pivot 9 to either one of the location 7 where the fiber 1 is connected and the location 8 where the sensing element 6 is connected to the arm 10. To increase the force exerted on the fiber 1, the length of the arm 10 may be increased. However, in addition to sensitivity, also the size of a sensor is an important design parameter. For this reason, increasing the length of the arm 10 is often not desired. Another option would be to increase the mass of sensing element 6 instead of providing a longer transmission arm 10. However, also increasing the mass in many cases comes down to increasing the size of the sensing actuator 6. Reducing, however, the stiffness of the fiber 1 (by effectively reducing the spring constant kf of the fiber), the sensitivity may be increased without resulting in an increase of size of the sensor device.

Figure 2:
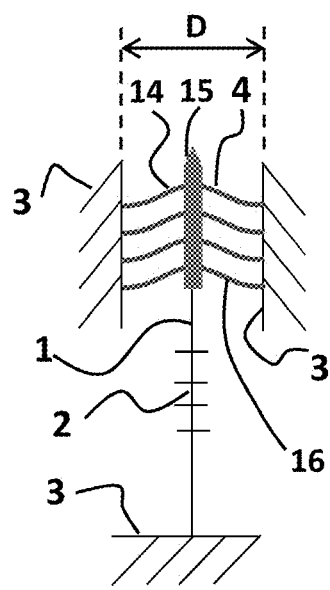
FIG. 2 schematically illustrates an embodiment of the present invention.

FIG. 2 schematically illustrates an optical sensor device in accordance with the present invention. In FIG. 2 and in the other figures described, similar parts and elements, or elements that provide the same or a similar function are referred to by the same or similar reference numerals. In FIG. 2, the transmission structure 4 comprises a bi-stable spring 14. The bi-stable spring 14 consists of a deflection element 15 and a plurality of buckled leaf springs 16. The buckled leaf springs 16 extend from wall sections of the fixed reference body 3, and connect the deflection element 15 by means of the buckled leaf springs 16 with the reference body 3. In this configuration, the bi-stable spring 4 provides a first and a second stable deflection position although in the invention it will be operated in a range of deflection positions in between these stable states (not including these). In the configuration of FIG. 2, a first end of the deflection element 15 is connected to an optical fiber 1. The optical fiber 1 comprises a Fiber Bragg Grating (FBG) 2. The other end of the optical fiber 1 is fixed to the reference body 3.

Although not illustrated in FIG. 2, an input action may be applied to the other (in FIG. 2: upper) end of the deflection element 15. In accordance with the present invention, the optical fiber 1 comprising the fiber bragg grating 2 is kept under tension. As a result of keeping the optical fiber 1 under tension, the optical fiber 1 behaves like a positive spring having a positive spring constant. Moreover, in accordance with the present invention, deflection of the bi-stable spring 14 is limited. The deflection element 15 will only move within a range of deflection positions wherein the bi-stable spring acts and a negative stiffness mechanism (negative spring). In this range, the bi-stable spring acts as if it is a spring having a negative spring constant. In other words the action of the bi-stable spring 14 in this range of deflection positions is opposite to the behavior of the optical fiber 1 acting as positive spring.

Considering the optical fiber 1 under tension, if the upper end of the optical fiber 1 (the end which is connected to the deflection element 15) would be pulled upwards, the spring force of the optical fiber 1 will increase such that the tension in the optical fiber increases. The bi-stable spring 14 in the operational range of deflection positions, will behave as a negative stiffness mechanism: it will add an additional force to the pulling force in case the deflection element 15 would be pulled upwards. Considering the fiber 1 and the bi-stable spring 14 as a system of springs, the negative spring constant of the bi-stable spring 14 compensates at least partly the positive spring constant of the optical fiber 1, thereby providing a net total combined spring constant which is lower than the positive spring constant of the optical fiber 1. For proper working of the optical sensor device, it is important that the combined net total spring constant of the system will be larger than zero. In fact, considering again equations (1) and (3) above, the system may be tuned in such a manner that the net total spring constant of the system provides the desired sensitivity $S_{a2w}$ while at the same time providing a large enough resonance frequency in view of the operational frequency range required for the optical sensor device. It will be appreciated, both the sensitivity and the operational frequency range will be dependent on the application of the optical sensor device.

Tuning of the bi-stable spring 14 may be achieved in various ways. For example, an adjustment arrangement may be provided which allows to tune the behavior of the bi-stable spring 14. For example, in FIG. 2 the distance D between the walls of the fixed reference body 3 may be made adjustable (e.g. by a screwing mechanism) to allow tuning of the spring behavior. Moreover, limiting deflection of the bi-stable spring 14 to the desired operational range of the deflection positions wherein the bi-stable spring 14 acts as a negative spring, may be achieved by connecting the upper end of the deflection mechanism 15 to a further element (e.g. the sensing element or a further part of the transmission structure 4). Preferably, the operational range of deflection positions is limited to a specific range wherein the negative spring behavior of the bi-stable spring 14 is substantially linear, i.e. the bi-stable spring acts as a linear negative spring. For a bi-stable spring 14 as illustrated in FIG. 2, this will be around the mid-point of the range of deflection positions between an unstable equilibrium and one of the two stable states.

Figure 8:
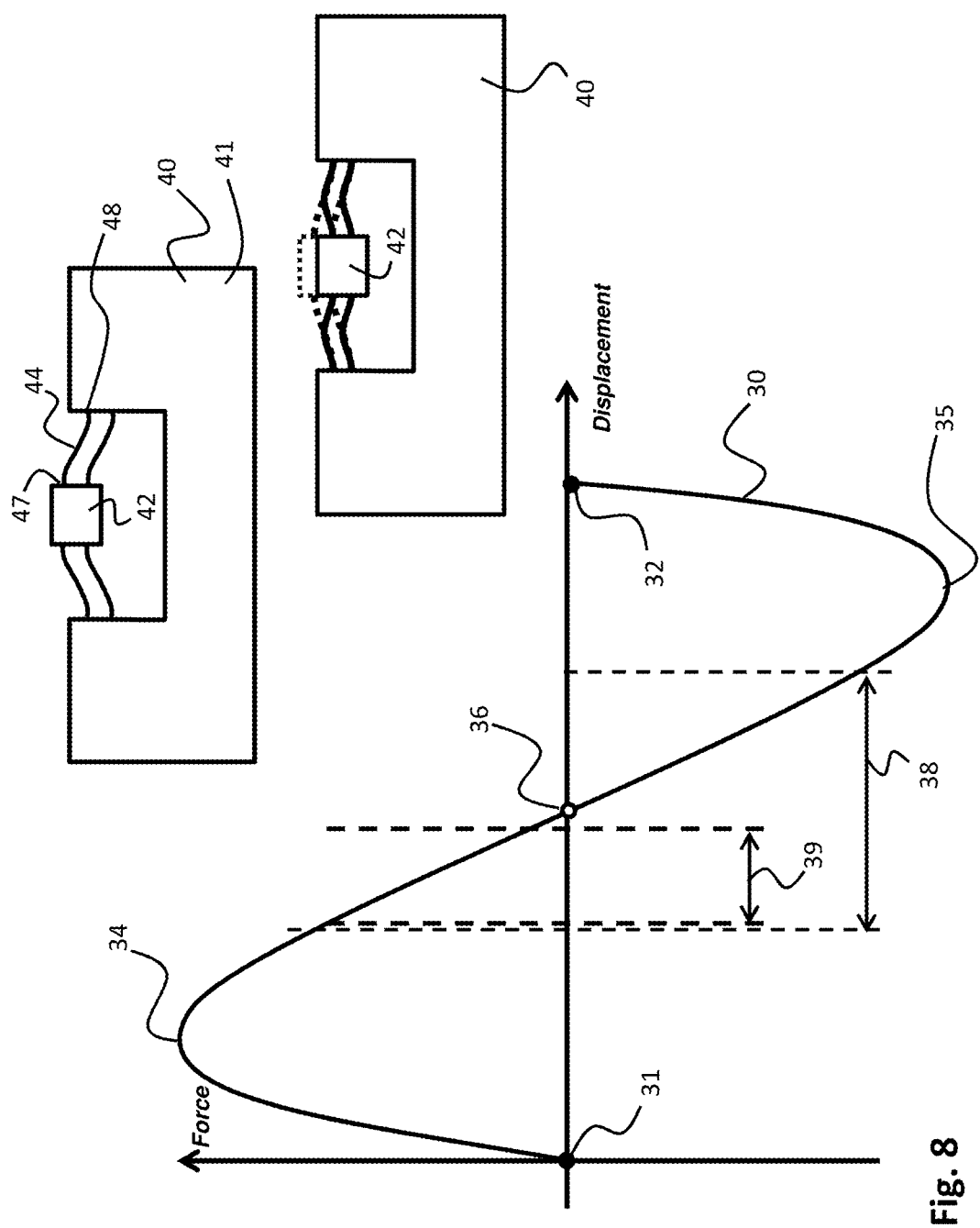
FIG. 8 schematically illustrates the spring behavior of a bi-stable spring in accordance with a first embodiment.

Reference is for example made to FIG. 8 wherein schematically a typical behavior of a bi-stable spring element 40 is illustrated. The bi-stable spring 40 comprises a deflection element 42 connected with leaf springs 44 between the walls of a fixed element 41. The leaf springs 44 extend with straight angles (perpendicular) from the fixed element 41 and from the deflection element 42. The leaf springs 44 are pre-stressed such as to be buckled to fit in between the walls of fixed element 41.

The spring force of the bi-stable spring is on the vertical axis, and the horizontal axis shows the deflection of element 42 from the first stable position 31. The curve 30 thus illustrates the spring force at each deflection position. Moving the deflection element 42 towards the other side of the spring 40, spring force will attempt to push the deflection element 42 back to the first stable position 31. This force will first increase until a maximum is reached in point 34. Then, the force will decrease again although it remains to be directed towards the first stable position 31 until the unstable equilibrium position 36 is reached. In this first part of the range, i.e. between position 31 and position 36, the force is of positive value indicating that it is directed towards the first stable position 31. Pushing the deflection element 42 further, past the unstable equilibrium 36, will cause the force to become negative—hence being directed at the second stable position 36. Thus the spring will snap to the other stable position. The force on the right hand side of point 36 will have a minimum at point 35, beyond which it will increase again until the second stable position 32 is reached.

Figure 9:
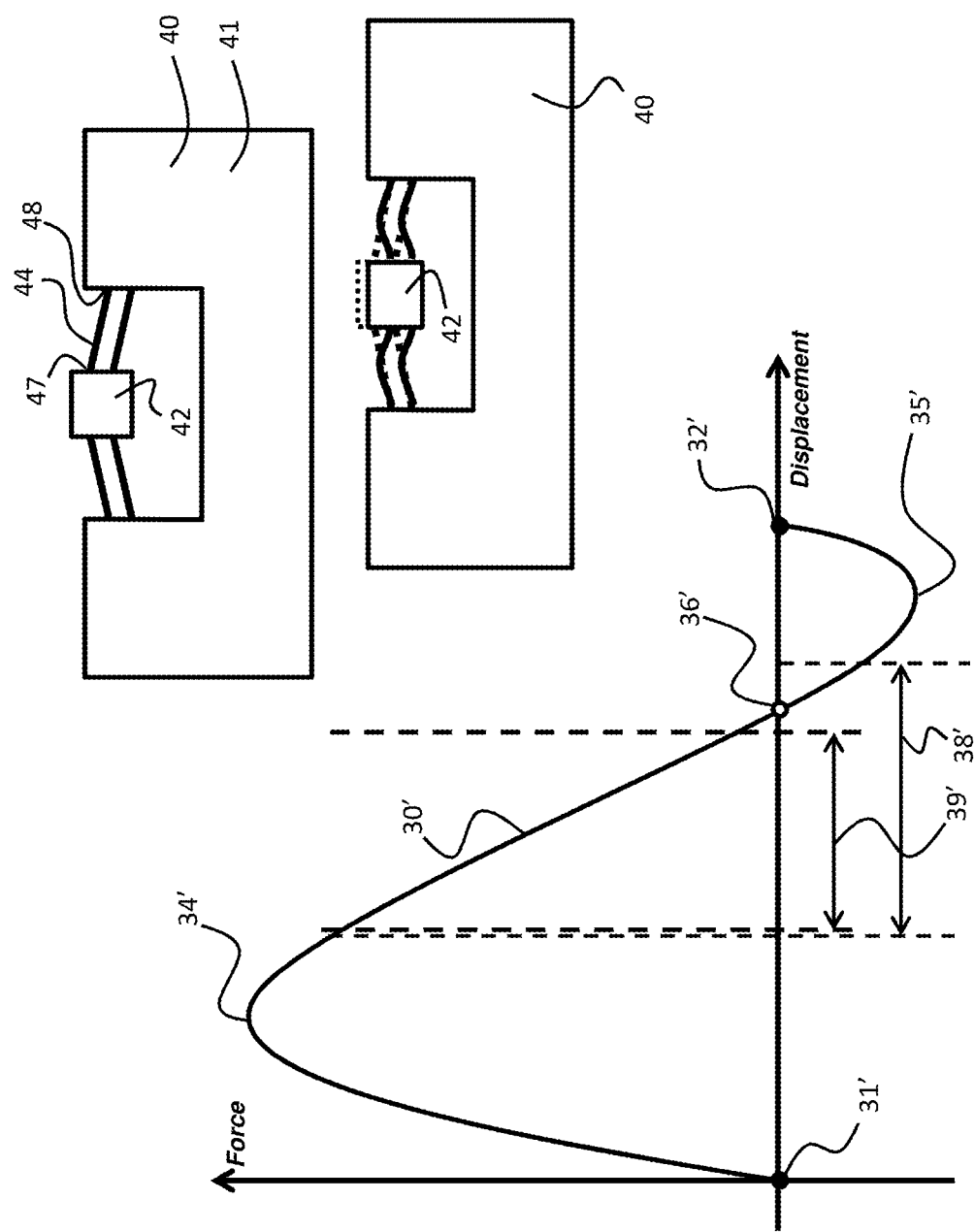
FIG. 9 schematically illustrates the spring behavior of a bi-stable spring in accordance with a second embodiment.

In the configuration of FIG. 8, the deflection element 42 across the full deflection range between stable positions 31 and 32, behaves in a symmetric fashion on the left hand and right hand side with respect to the unstable equilibrium position 36. Another variant of spring 40 is illustrated in FIG. 9, including the spring force curve 30'. The leaf springs 44 of spring 40 in FIG. 9 do not extend perpendicular from the walls of the fixed element 41 and the deflection element 42. Instead, these leaf spring are slightly angled, e.g. in a similar manner as in FIG. 7 described further below. As a result of the angling of the leaf springs 44 toward the first equilibrium position 31' (i.e. the position wherein spring 40 in FIG. 9 is illustrated), the spring force curve 30' has become assymetric with respect to the unstable equilibrium position 36'. This position 36' has been shifted further to the right hand side towards the second stable position. Therefore, the deflection element 42 must be pushed further starter from position 31' in order to reach the unstable equilibrium position 36' and snap through to the second position 32'.

The difference between the springs of FIGS. 8 and 9 is evident by considering their spring force curves 30 and 30'. In FIG. 8, the negative stiffness range—the range of deflection positions wherein the spring acts as a negative spring—is indicated by 38. In FIG. 9 this is 38'. Both ranges are just as broad, however, in FIG. 9 only a small part of the range is located on the right hand side (i.e. the snap through side) of the unstable equilibrium position 36'. The operational deflection position range 39 and 39' is also illustrated in FIGS. 8 and 9 for both springs. Clearly, the angling of the leaf springs 44 has caused the operational deflection position range 39' to be much broader. In this respect, it is important to realize that it is to be prevented that the bi-stable spring is operated across the unstable equilibrium position 36', because this would cause the spring to snap through and break the intrinsic fiber optic sensor.

In accordance with the invention, the bi-stable spring can be implemented during manufacturing of the optical sensor device by moving the deflector to the range 39 or 39' (dependent on which version of the spring is applied). Then connecting the fiber and tuning the tension of the fiber such as to counteract the system for balancing it. Correct tuning of the tension enables to keep the bi-stable spring to be operated within operational deflection position range 39', while maintaining a continuous tension on the fiber.

Figure 3:
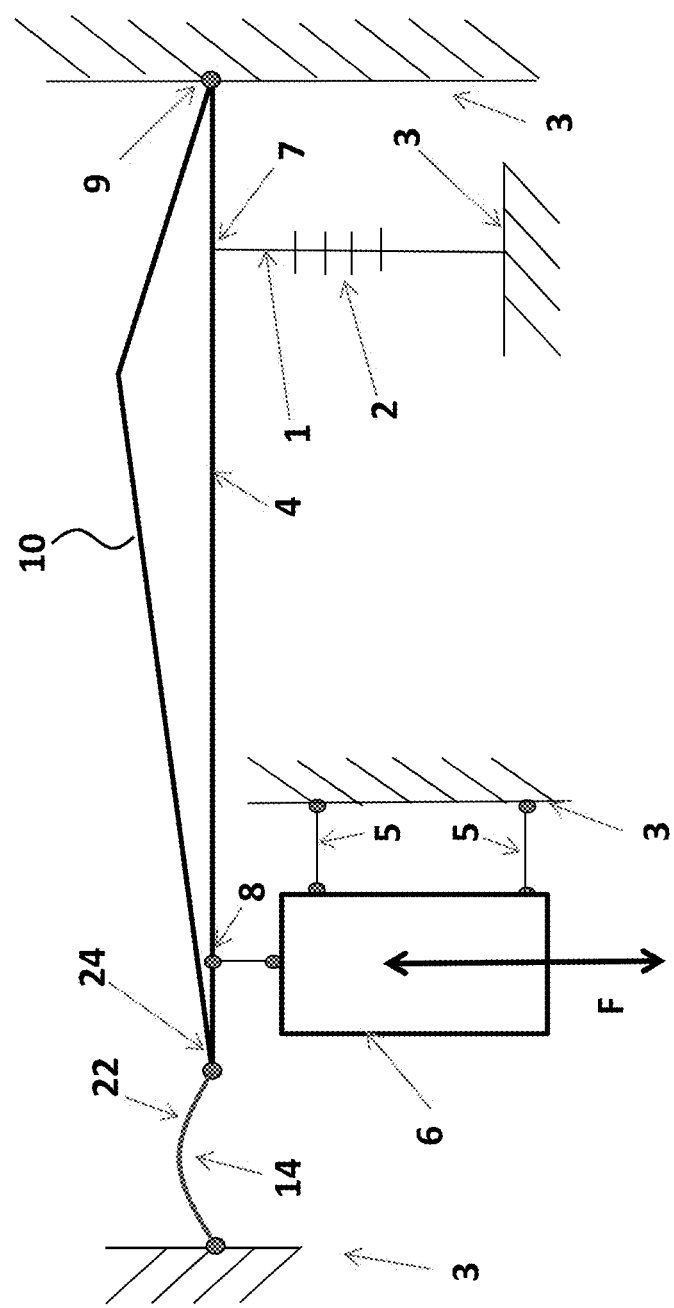
FIG. 3 schematically illustrates an embodiment of the present invention.

A further embodiment of the present invention is schematically illustrated in FIG. 3. FIG. 3 illustrates the sensing element 6 being connected to a transmission structure 4. The transmission structure 4 comprises a transmission arm 10 which is at an end part 24 thereof connected to a buckled leaf spring 22. The other end of the transmission arm 10 comprises a pivot 9 connecting the transmission arm 10 to the fixed reference body 3. The hingable structure of the transmission arm 10 coupled to the buckled leaf spring 22 forms a bi-stable spring 14: the system of the transmission arm 10 and the leaf spring 22 has two stable states. In the buckled state of the leaf spring 22 of FIG. 3, the pre-stressing of the leaf spring 22 causes the system to act as a bi-stable spring. In addition, the transmission arm 10 still also forms a transmission arm between the sensing element 6 and the optical fiber 1.

Figure 4:
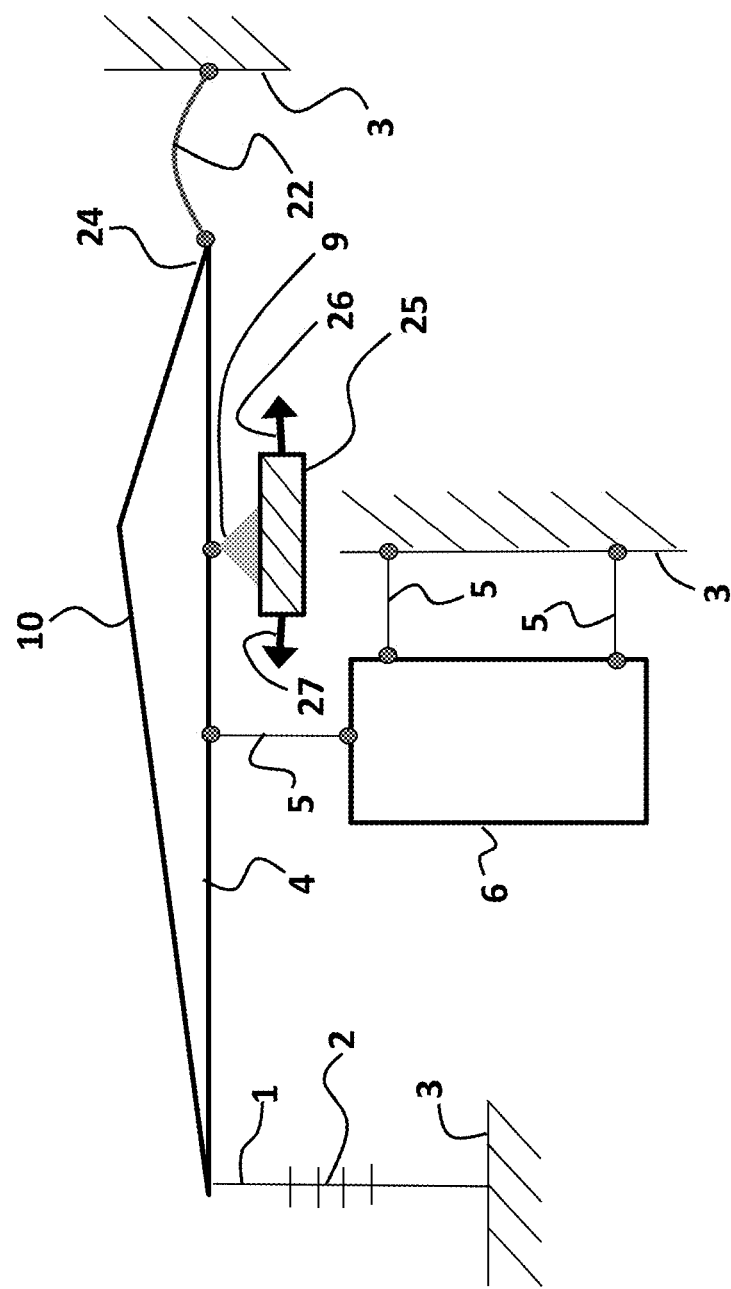
FIG. 4 schematically illustrates an embodiment of the present invention.

A further embodiment of the present invention is schematically illustrated in FIG. 4. Here, the transmission structure comprises a transmission arm 10 connected via a pivot 9 to an adjustment arrangement 25. The adjustment arrangement 25 can be moved to the right or to the left (as illustrated by the arrows 26 and 27) along the length of the arm 10. At a first end of the transmission arm 10, the optical fiber 1 comprising the Fiber Bragg Grating 2 is connected. On the other end of the transmission arm 10, the leaf spring 22, which is prestressed by means of buckling is connected to the transmission arm 10. Again, considering the transmission arm 10 and the leaf spring 22 form a bi-stable spring element.

Input action on the sensing actuator 6 is transferred to the optical fiber 1 and fiber bragg grating 2. The transmission structure 4 is formed by the transmission arm 10, the buckled leaf spring 22, the pivot 9 and the adjustment mechanism 25. By moving the adjustment mechanism 25 to the left or to the right, the transmission ratio between the spring element 22 and the optical fiber 1 can be adjusted for tuning the behavior of the optical sensor device of the present invention. As will be appreciated, moving the pivot 9 will likewise influence the transmission ratio between the sensing element 6 and the optical fiber 1. Where desired, this effect may be diminished by moving the sensing actuator 6 closer to the optical fiber 1.

Figure 5:
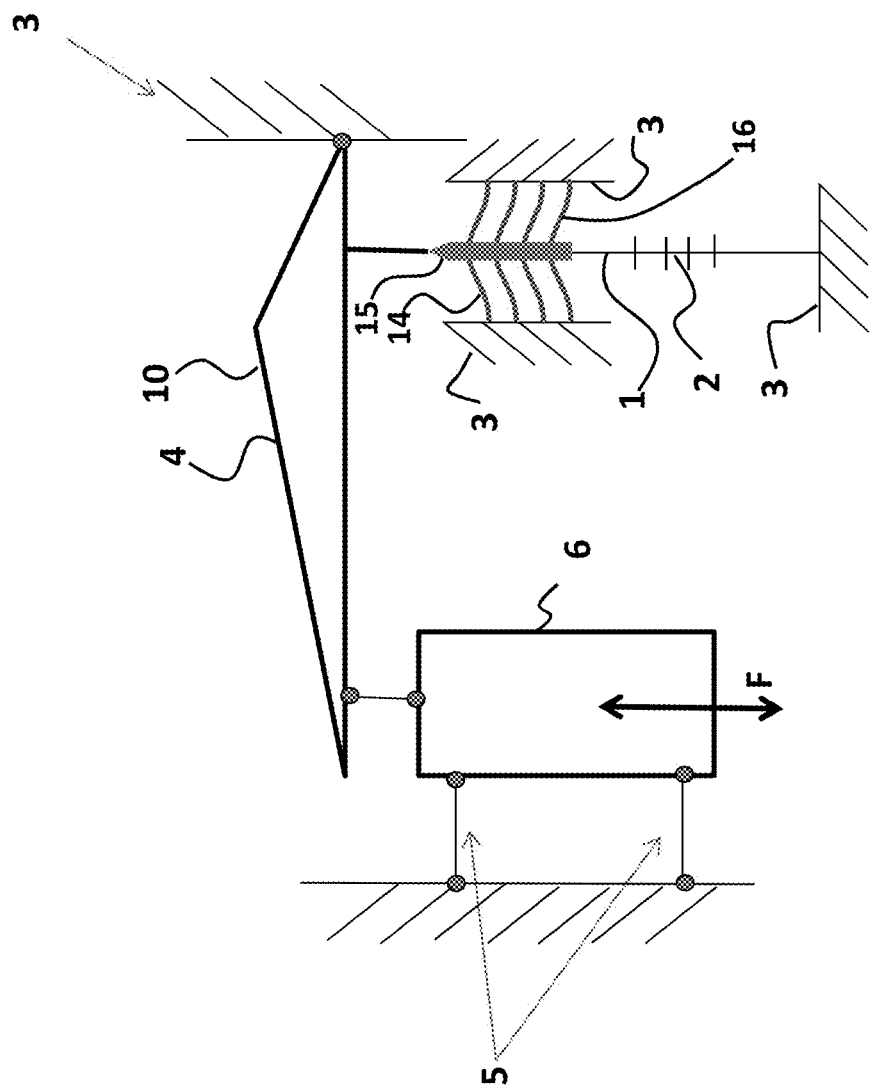
FIG. 5 schematically illustrates an embodiment of the present invention.

A further embodiment of the present invention is illustrated in FIG. 5. Here, an arrangement as is illustrated in FIG. 2 connects the fiber 1 to the transmission arm 10. The transmission structure 4 is formed by the transmission arm 10 and the bi-stable spring 14.

Figure 6:
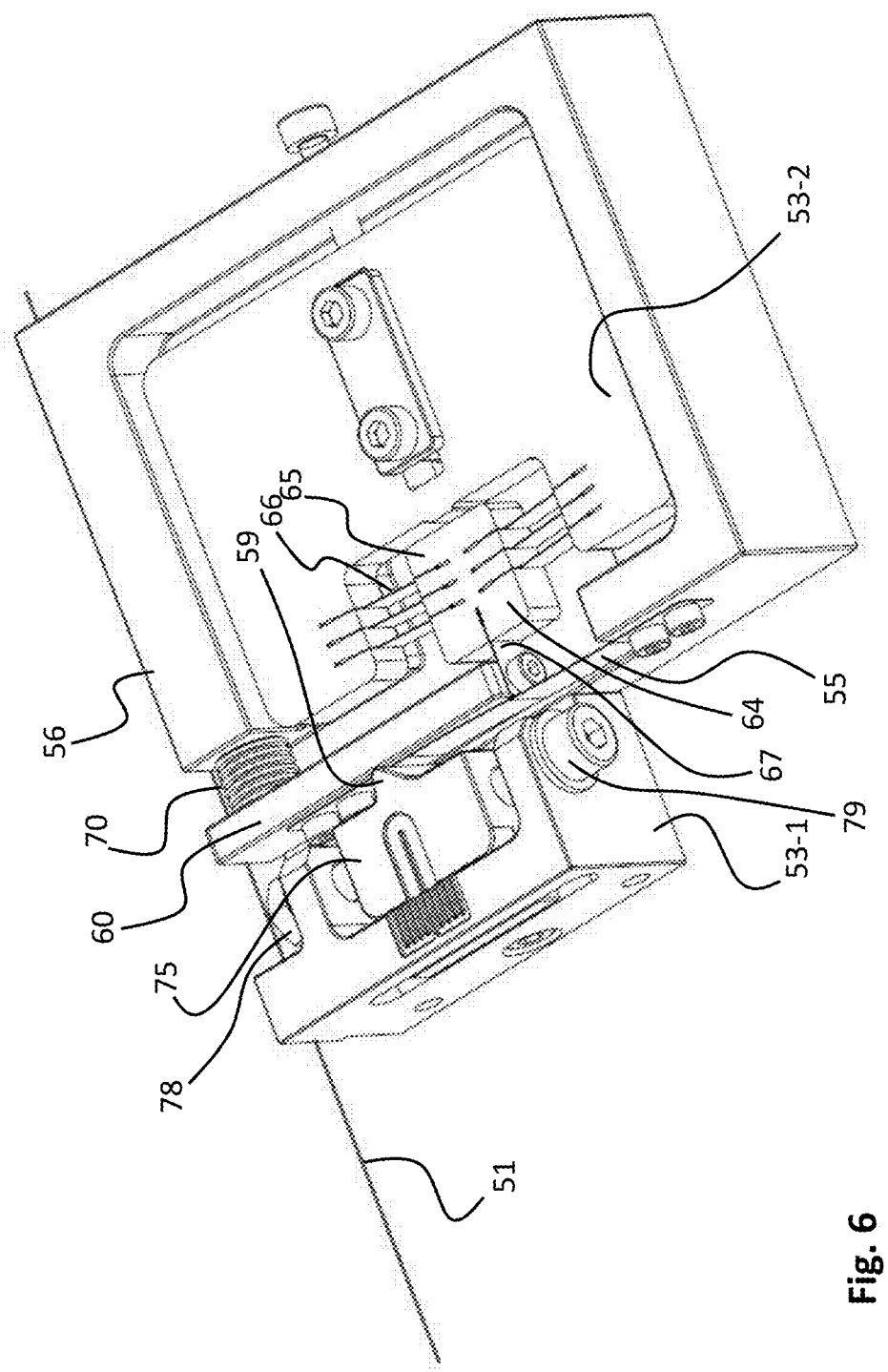
FIG. 6 illustrates an optical sensor device design in accordance with the present invention.

An implementation similar to the embodiment of FIG. 4 is illustrated in FIG. 6. The sensing element 56 of FIG. 6 is part of a pressure sensor. This sensing element 56 is connected by means of a bellows 70 to a transmission arm 60 of the optical sensor device. Near the connection with the bellows 70 on the transmission arm 60, an optical fiber 51 comprising a Fiber Bragg Grating (not visible) is connected to the transmission arm 60. The Fiber Bragg Grating is arranged in the fiber 51 in between the connection with the transmission arm 60, and the connection of the fiber to the reference body 53-1. Motion in the arm 60 will stretch or shorten the optical fiber 51 in this area, resulting in a shift of wavelength of the Fiber Bragg Grating. In accordance with the present invention, a bi-stable spring 64 is connected by connection 57 to the other end of the transmission arm 60. The bi-stable spring 64 consists of a deflection element 65 and a plurality of leaf springs 66. The leaf springs are slightly buckled connecting the deflection element 65 with the fixed reference body 53-2. The separate parts 53-1 and 53-2 of the fixed reference body are preferably fixed with respect to each other (e.g. part of a larger body structure). The sensing element 56 is connected by means of a hingeable connection 55 with a transmission arm 60.

The embodiment of FIG. 6 further comprises an adjustment arrangement 75 comprising an adjustable pivot 59. The position of the pivot 59 along the length of the transmission arm 60 may be adjusted by turning the screws 78 and 79 of the adjustment arrangement 75. This allows tuning of the contributions of the bi-stable spring 68 and the sensed optical fiber 1.

Figure 7:
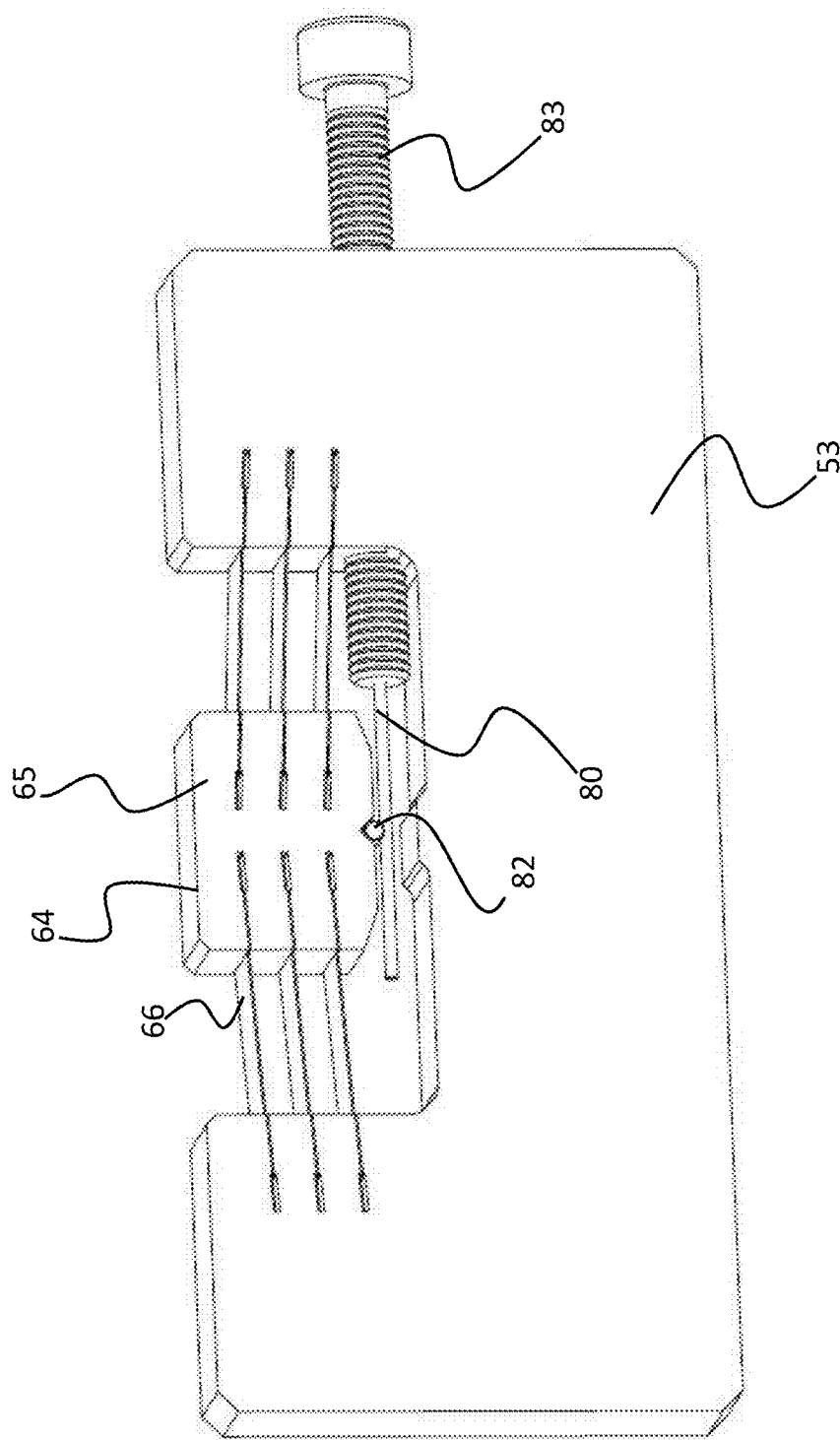
FIG. 7 illustrates an adjustable bi-stable spring usable with embodiments of the present invention.

FIG. 7 illustrates an adjustable bi-stable spring 64 that may be used in an optical sensor device in the present invention. The adjustable bi-stable spring 64 comprises a adjustment element 80 in the form of a deflection beam. The deflection beam 80 is a positive spring, characterized by a positive spring constant. The connection with the deflection element 65 of the bi-stable spring 64 is obtained by element 82. By screwing the adjustment screw 83 relative to the fixed reference body 53, the position of the connection 82 relative to the deflection beam 80 will change. As may be appreciated, the positive spring constant will decrease in case the element 82 moves further to the free end of the deflection beam 80. Likewise, the positive spring constant becomes more positive (the element 80 becomes more stiff) in case the end of the screw 83 is moved closer to the connection element 82.

The present invention has been described in terms of some specific embodiments thereof. It will be appreciated that the embodiments shown in the drawings and described herein are intended for illustrated purposes only and are not by any manner or means intended to be restrictive on the invention. It is believed that the operation and construction of the present invention will be apparent from the foregoing description and drawings appended thereto. It will be clear to the skilled person that the invention is not limited to any embodiment herein described and that modifications are possible which should be considered within the scope of the appended claims. Also kinematic inversions are considered inherently disclosed and to be within the scope of the invention. In the claims, any reference signs shall not be construed as limiting the claim. The term 'comprising' and 'including' when used in this description or the appended claims should not be construed in an exclusive or exhaustive sense but rather in an inclusive sense. Thus the expression 'comprising' as used herein does not exclude the presence of other elements or steps in addition to those listed in any claim. Furthermore, the words 'a' and 'an' shall not be construed as limited to 'only one', but instead are used to mean 'at least one', and do not exclude a plurality. Features that are not specifically or explicitly described or claimed may be additionally included in the structure of the invention within its scope. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. Additions, deletions, and modifications within the purview of the skilled person may generally be made without departing from the spirit and scope of the invention, as is determined by the claims. The invention may be practiced otherwise then as specifically described herein, and is only limited by the appended claims.

The invention claimed is:

1. An optical sensor device, comprising:
a sensing element for receiving an input action;
an optical fiber comprising an intrinsic fiber optic sensor; and
a transmission structure arranged for exerting a sensing action on the optical fiber in response to the input action received by the sensing element, wherein the optical fiber in a first connecting part thereof is connected to a reference body and the optical fiber in a second connecting part thereof is connected to the transmission structure for receiving the sensing action, the first connecting part and the second connecting part of the optical fiber being located on either side of the intrinsic fiber optic sensor,
wherein the transmission structure comprises a bi-stable spring having a first and a second stable deflection position and a negative stiffness range around an unstable equilibrium position between the first and second stable deflection position, and the optical fiber between the transmission structure and the reference body is pre-stressed to be tensed, the optical fiber thereby acting as a spring having a first spring constant of positive value, wherein the optical fiber thereby counteracts a spring action of the bi-stable spring to operate the bi-stable spring in a deflection position range within the negative stiffness range, the deflection position range not including the unstable equilibrium position of the bi-stable spring.

2. The optical sensor device according to claim 1, wherein the tensed optical fiber and the bi-stable spring are connected to provide a combined net total spring constant of positive value.

3. The optical sensor device according to claim 2, further comprising an adjustment arrangement for tuning of the combined net total spring constant.

4. The optical sensor device according to claim 3, wherein the transmission structure comprises a transmission arm, the bi-stable negative spring is connected with the transmission arm at a first location thereof, and the optical fiber is connected with the transmission arm at a second location thereof, the transmission arm being pivotable relative to a pivot, wherein the adjustment arrangement comprises an adjustment element for adjusting the location of the pivot for enabling adjustment of a transmission ratio thereof.

5. The optical sensor device according to claim 4, wherein the adjustment arrangement comprises a tunable positive spring element cooperating with the bi-stable spring for forming a spring assembly for enabling tuning of the negative second spring constant provided by the spring assembly, and the tunable positive spring element comprises a tuning arrangement for tuning the spring constant of the tunable positive spring element.

6. The optical sensor device according to claim 5, wherein the tunable positive spring element is an adjustable deflection beam and the tuning arrangement comprises a position adjustment arrangement for adjusting a position of the deflection beam relative to the bi-stable spring.

7. The optical sensor device according to claim 1, wherein the bi-stable negative spring element comprises a deflection element and one or more leaf springs, the leaf springs connecting the deflection element with a fixed element, wherein the fixed element is fixed with respect to the reference body.

8. The optical sensor device according to claim 7, wherein the one or more leaf springs extend from fixed element under an angle therewith in a direction towards one of the first and second stable deflection positions, and the one stable deflection position is arranged with respect to the unstable equilibrium position at a same side as the deflection position range wherein the bi-stable spring is operated.

9. The optical sensor device according to claim 1, wherein the transmission structure comprises a transmission arm, and the bi-stable spring is formed by connecting an end part of the transmission arm with the fixed reference body by means of a pre-loaded spring.

10. The optical sensor device according to claim 1, wherein the optical fiber is connected with the second part thereof to the bi-stable negative spring.

11. The optical sensor device according to claim 1, wherein the optical sensor device is at least one element of a dynamic sensor for sensing dynamic signals or a static sensor for sensing static sensors; or
   the sensing element comprises at least one element of an inertial mass to provide an accelerometer or a deformable body to provide a pressure sensor.

12. The optical sensor device according to claim 1, wherein the intrinsic fiber optic sensor comprises at least one of a fiber bragg grating, photonic crystal fiber, a birefringent fiber, a fiber laser, or a multicore fiber.

13. A sensor apparatus comprising one or more optical sensor devices for sensing one or more input actions applied in one or more directions, each optical sensor device of the one or more optical sensor devices comprising:
   a sensing element for receiving the one or more input action;
   an optical fiber comprising an intrinsic fiber optic sensor; and
   a transmission structure arranged for exerting a sensing action on the optical fiber in response to the input action received by the sensing element, wherein the optical fiber in a first connecting part thereof is connected to a reference body and the optical fiber in a second connecting part thereof is connected to the transmission structure for receiving the sensing action, the first connecting part and the second connecting part of the optical fiber being located on either side of the intrinsic fiber optic sensor,
   wherein the transmission structure comprises a bi-stable spring having a first and a second stable deflection position and a negative stiffness range around an unstable equilibrium position between the first and second stable deflection position, and the optical fiber between the transmission structure and the reference body is pre-stressed to be tensed, the optical fiber thereby acting as a spring having a first spring constant of positive value, wherein the optical fiber thereby counteracts a spring action of the bi-stable spring to operate the bi-stable spring in a deflection position range within the negative stiffness range, the deflection position range not including the unstable equilibrium position of the bi-stable spring.

14. A cable comprising:
   one or more optical sensor devices, the one or more optical sensor devices comprising:
      a sensing element for receiving the one or more input action;
      an optical fiber comprising an intrinsic fiber optic sensor; and
      a transmission structure arranged for exerting a sensing action on the optical fiber in response to the input action received by the sensing element, wherein the optical fiber in a first connecting part thereof is connected to a reference body and the optical fiber in a second connecting part thereof is connected to the transmission structure for receiving the sensing action, the first connecting part and the second connecting part of the optical fiber being located on either side of the intrinsic fiber optic sensor,
      wherein the transmission structure comprises a bi-stable spring having a first and a second stable deflection position and a negative stiffness range around an unstable equilibrium position between the first and second stable deflection position, and the optical fiber between the transmission structure and the reference body is pre-stressed to be tensed, the optical fiber thereby acting as a spring having a first spring constant of positive value, wherein the optical fiber thereby counteracts a spring action of the bi-stable spring to operate the bi-stable spring in a deflection position range within the negative stiffness range, the deflection position range not including the unstable equilibrium position of the bi-stable spring.

15. A method of manufacturing an optical sensor device, comprising:
   providing a sensing element for receiving an input action;
   providing an optical fiber comprising an intrinsic fiber optic sensor; and
   providing a transmission structure for exerting, in operation, a sensing action on the optical fiber in response to the input action received by the sensing element, wherein the transmission structure includes a bi-stable spring having a first and a second stable deflection position and a negative stiffness range around an unstable equilibrium position between the first and second stable deflection position; and
   connecting the optical fiber between a reference body and the transmission structure such that the intrinsic fiber optic sensor is arranged between the transmission structure and the reference body by:
   pre-stressing the bi-stable spring to a deflection position arranged within the negative stiffness range at one side of the unstable equilibrium position;
   connecting the optical fiber to the transmission structure; and
   pre-stressing the optical fiber to be tensed, for thereby acting as a spring having a first spring constant of positive value, wherein the optical fiber thereby counteracts a spring action of the bi-stable spring to operate the bi-stable spring in a deflection position range within the negative stiffness range, the deflection position range not including the unstable equilibrium position of the bi-stable spring.

* * * * *